O. D. WATKINS.
BRAKE SHOE KEY.
APPLICATION FILED FEB. 6, 1922.

1,435,769.

Patented Nov. 14, 1922.

Oscar D. Watkins.
INVENTOR

BY Victor J. Evans
ATTORNEY

WITNESS

Patented Nov. 14, 1922.

1,435,769

UNITED STATES PATENT OFFICE.

OSCAR D. WATKINS, OF PHILADELPHIA, PENNSYLVANIA.

BRAKE-SHOE KEY.

Application filed February 6, 1922. Serial No. 534,564.

*To all whom it may concern:*

Be it known that I, OSCAR D. WATKINS, a citizen of the United States, residing at Philadelphia, in the county of Philadelphia and State of Pennsylvania, have invented new and useful Improvements in Brake-Shoe Keys, of which the following is a specification.

This invention relates to a novel brake shoe key or lock for locking the brake shoe to the brake head of a railroad car brake, the essential feature thereof being to provide a resilient key locking means for retaining said key in a locked position with relation to the brake shoe and brake head.

A further object of my invention is to provide a key or locking device of the foregoing specified character on one face of which is carried a flat steel spring or locking member, the free end of which is adapted to engage in a notched portion of the brake shoe to retain the key in a fixed position with relation to said shoe and the head of the brake. Furthermore, means are provided for withdrawing said spring locking member out of engagement with the brake shoe to allow for the removal of said key to disassemble the brake.

With the foregoing objects in view my invention consists essentially in the illustrated constructions of brake shoe keys hereinafter fully described and the novel features whereof are more specifically defined by the appended claims.

In the further disclosure of the invention reference is to be had to the accompanying sheet of drawings constituting a part of this specification and in which like characters of reference designate the same or corresponding parts in all the views.

Figure 1:
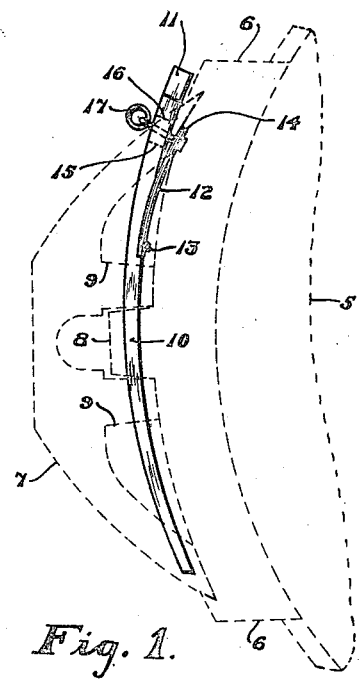

Figure 1— is a side elevation of a railroad car brake in dotted lines, said car brake being illustrated in conjunction with a similarly shown car wheel, one practical embodiment of my novel brake shoe key being shown in operative position in connection therewith by the full lines, said form of key being more specifically devised for use on passenger car brakes.

Figure 2:
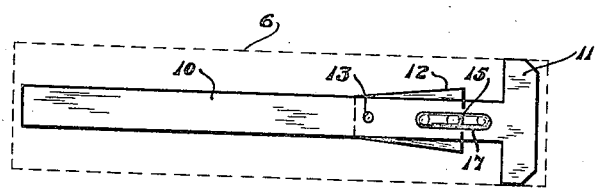

Figure 2— is a plan or face view of the key illustrated by the preceding figure with the brake block indicated by dotted lines.

Figure 3:
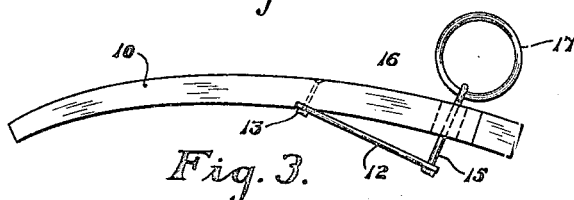
Figure 4:
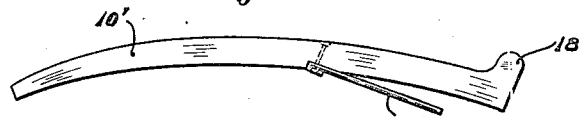

Figure 3— is a side elevation of the key illustrated by the preceding figures but with the locking member indicated in extended position; and, Figure 4— is a side elevation of a type of brake shoe key in accordance with this invention but more particularly adapted for use upon the brakes of freight cars.

Referring to the drawings and more particularly to Figures 1, 2, 3, I have illustrated a type of brake shoe or locking key for use in connection with the brakes of railroad passenger cars, and in which figures the numeral 5 designates a fragment of a railroad car wheel upon which the brake operates. The brake is of the standard type and includes a brake shoe 6 which is held in fixed relation to a brake head 7 by means of my novel locking key. The brake shoe 6 has formed on its inner face a lock or projection 8 which is adapted to be positioned between a pair of lugs 9, 9 on the face of the brake head 7, and said lugs are provided with aligned openings through which the brake shoe key passes.

My novel construction of brake shoe or locking key 10 consists of an elongated body portion which is provided at one end or its upper portion with a T-head 11 to facilitate the removal of said key when disassembling the brake. This key 10 in side elevation is curved and tapered in the ordinary manner to allow for its easy passage through the aligning openings in the lugs 8, 9 of the brake shoe 6 and brake head 7, respectively when assembling the brake.

My invention especially consists in providing a resilient locking member 12 on the inner face of the brake shoe or locking key 10, said resilient locking member 12 comprising a flat steel spring, one end of which is secured at 13 to the key 10 while the free end thereof is adapted to engage in a notched-out portion 14 of the brake shoe 6 when the brake is assembled and thereby prevent displacement of said key 10. To the free end of the spring 12 there is secured a rod or pin 15 which is adapted to pass through a slot or opening 16 in the key 10, and said rod or pin has attached to its outer or free end a finger ring 17 for withdrawing the free end of the spring 12 from the notched-out portion 14 of the brake shoe 6 and thereby allow for the easy removal of the key 10 to disassemble the brake shoe from the brake head 7.

In the embodiment of my invention shown in Figure 4 I have illustrated a key to be used in connection with the brakes of freight cars, said key consisting of an elongated body portion 10' of similar formation to that shown in Figures 1, 2, 3, with the exception of the elimination of the T-head and the substitution therefor of an enlargement 18 which is used to facilitate the removal of the key 10'. In this form of my invention I have also eliminated the rod or pin 15 and the finger ring 17 for the withdrawal of the free end of the spring 12' from the notched-out portion 14 of the brake shoe 6, it being found that such is unnecessary in the brakes of freight cars as the shoes are not renewed as frequently as the shoes on the brakes of passenger cars.

From the foregoing it will be readily seen that by my invention I have provided an efficient and practical means for holding the locking key for brake shoes and brake heads against displacement and consequent accidental disassembling of said parts.

Having described my invention, what I claim as new and desire to secure by Letters Patent is:

1. A brake shoe key comprising in combination a brake head and brake shoe adapted to be secured in position on said brake head, a key for locking said parts together, said key extending substantially parallel to the inner face of the brake shoe, said inner face of the brake shoe having a notched out portion, a resilient locking means carried by said key which is adapted to engage in the notched out portion of said brake shoe, and means for withdrawing said resilient locking means out of engagement with the said notched out portion of the brake shoe to allow for the removal of the key.

2. A brake shoe key comprising in combination a brake head and brake shoe adapted to be secured in position on said brake head, a key for locking said parts together, said key extending substantially parallel to the inner face of the brake shoe, said inner face of the brake shoe having a notched out portion, a resilient locking means carried by said key which is adapted to engage in the notched out portion of said brake shoe, a flat spring one end whereof is secured to the underside of the brake shoe key while the free end of said spring is adapted to engage in the aforesaid notched out portion of the brake shoe, and means for moving the free end of said flat spring out of engagement with the notched out portion of the shoe, said means including a pin passing through the key and having a finger ring at its outer end.

In testimony whereof I affix my signature.

OSCAR D. WATKINS.